June 3, 1930.  O. J. BARTH  1,760,865
AIRPLANE
Filed May 27, 1929  3 Sheets-Sheet 1
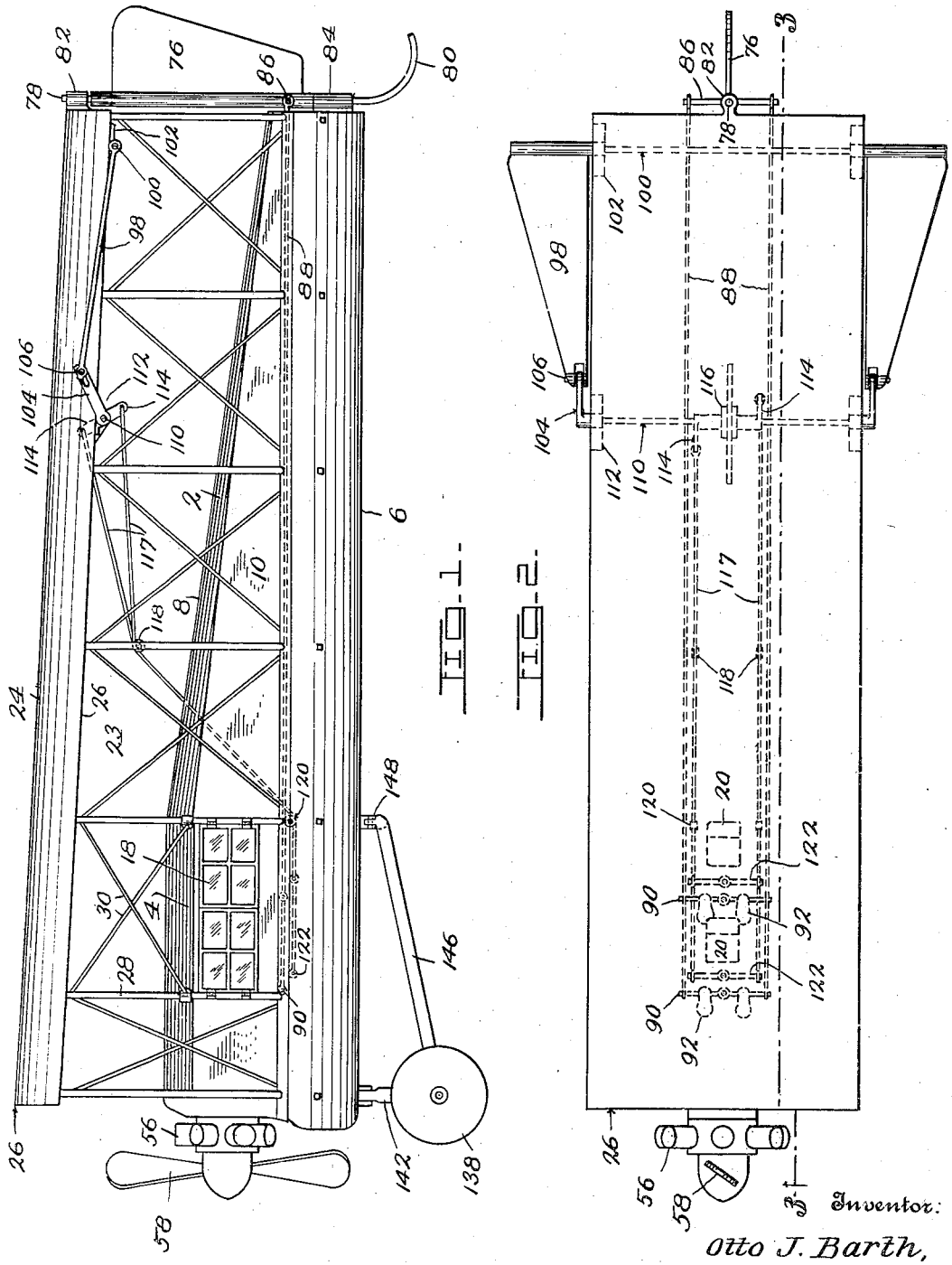
Witness:
Fred C. Fischer
Inventor:
Otto J. Barth,
By F. G. Fischer,
Attorney.

June 3, 1930.    O. J. BARTH    1,760,865
AIRPLANE
Filed May 27, 1929    3 Sheets-Sheet 2
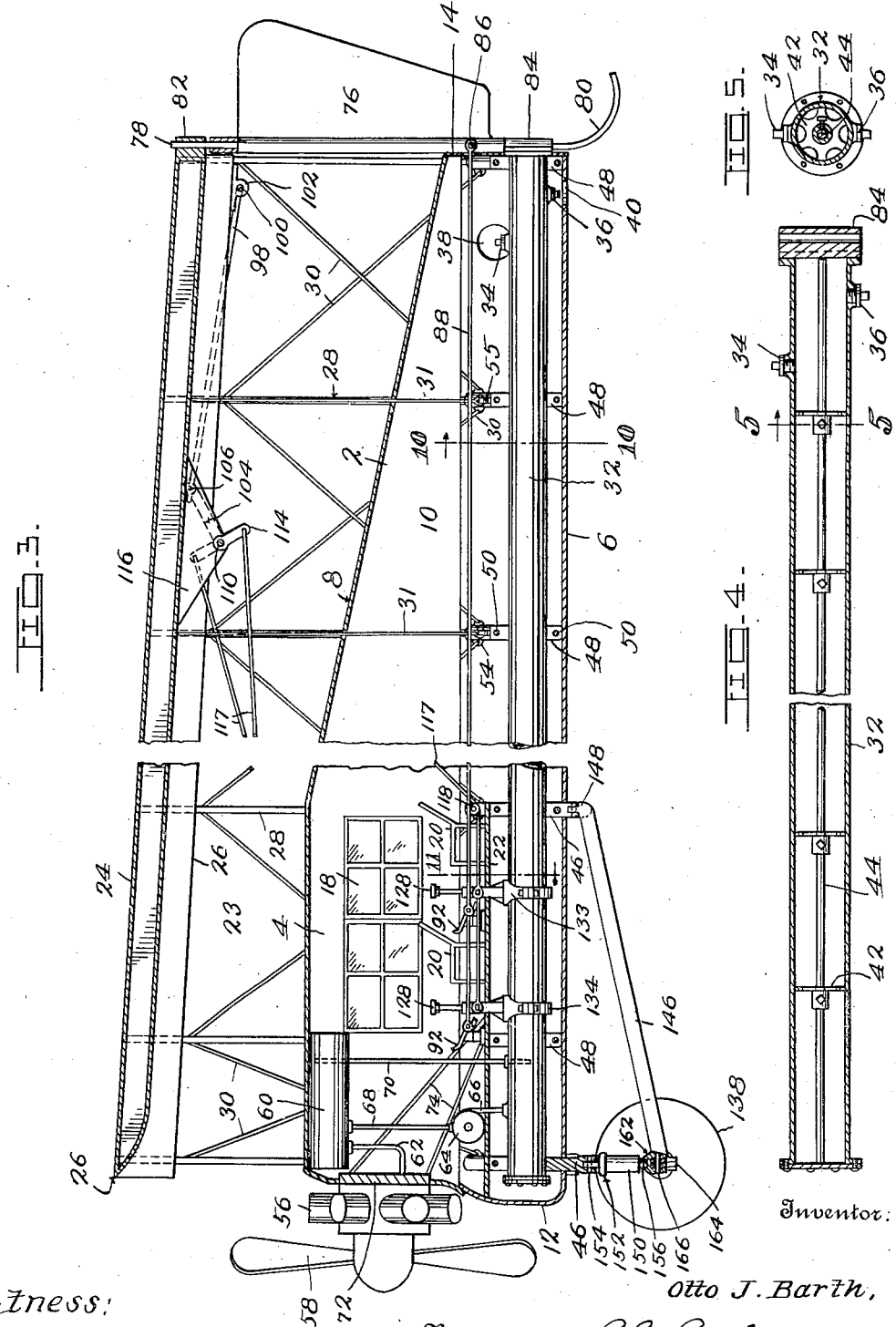

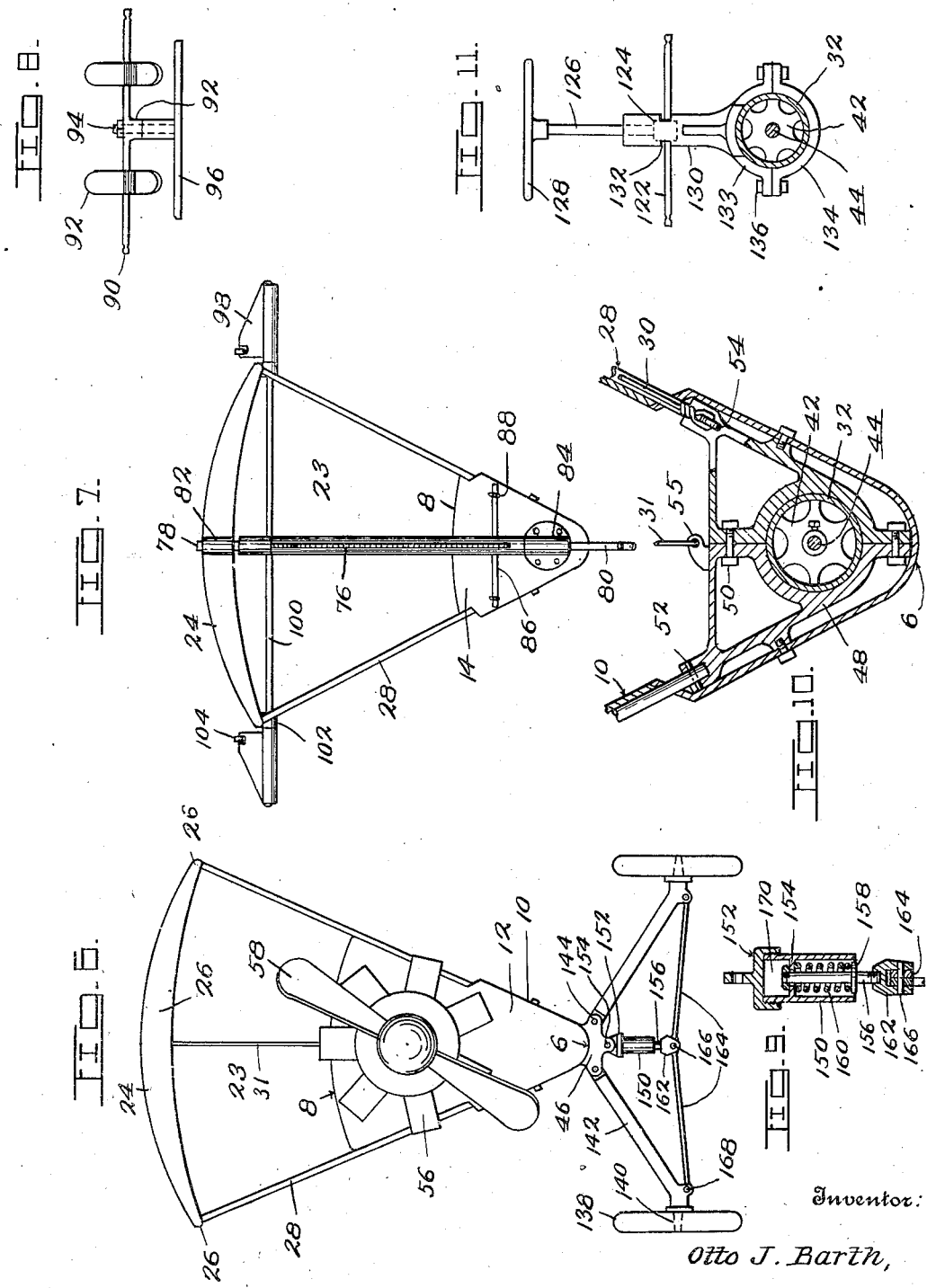

Patented June 3, 1930

1,760,865

UNITED STATES PATENT OFFICE

OTTO J. BARTH, OF KANSAS CITY, MISSOURI

AIRPLANE

Application filed May 27, 1929. Serial No. 366,306.

My invention relates to airplanes and one important feature resides in the wing which is relatively narrow to reduce to a minimum the air resistance to the forward movement of the airplane, but which extends approximately the full length of the fuselage to provide sufficient area for obtaining ample lifting power when taking off and for sustaining the airplane while in flight. A further feature resides in locating the wing directly over the fuselage where it will clear ground obstructions and lend stability to the airplane by placing the center of lift above the center of weight. Another feature resides in the shape of the wing which is arched transversely so that its longitudinal axis will be higher than its longitudinal margins to prevent side slips when the airplane is subjected to adverse winds or when turning around while in flight.

Another feature of the invention resides in the main fuel tank which is located in the bottom of the fuselage to lower the center of weight and extends approximately the full length of said fuselage to reinforce the latter and provide ample fuel capacity for extended trips.

Another feature resides in the peculiar shape of the fuselage which is approximately of triangular cross sectional configuration to avoid obstructing the vision of the pilot when looking downward or forward.

A further feature resides in novel shock absorbing means for relieving jar and avoiding accidents to the landing gear when the airplane is either taking off or landing.

With the above and other objects in view, which will hereinafter appear, reference will now be had to the accompanying drawings, in which:

Fig. 1 is a side elevation of an airplane constructed in accordance with my invention.

Fig. 2 is a plan view of the airplane.

Fig. 3 is an enlarged broken longitudinal section taken on line 3—3 of Fig. 2.

Fig. 4 is a longitudinal section of the main fuel tank.

Fig. 5 is a cross section of the main fuel tank on line 5—5 of Fig. 4.

Fig. 6 is a front elevation of the airplane.

Fig. 7 is a rear elevation of the airplane with the forward portions removed.

Fig. 8 is an elevation of the foot control for the rudder.

Fig. 9 is a vertical section of shock absorbing means for the landing gear.

Fig. 10 is an enlarged broken section on line 10—10 of Fig. 3.

Fig. 11 is a vertical sectional view on line 11 of Fig. 3.

In carrying out the invention I provide a fuselage 2 which is provided at its forward portion with an enclosed cabin 4, although if desired the well-known cockpit may be substituted for said cabin. As shown by Figs. 6 and 7 the fuselage is of approximately triangular cross sectional configuration and consists of a bottom portion 6, a top portion 8, said walls 10 and front and rear portions 12 and 14, respectively. Outwardly opening windows 18 are provided at each side of the cabin 4 for ingress and egress and a plurality of seats 20, mounted upon the cabin floor 22, are provided for the pilot and passengers.

Spaced a suitable distance above the top 8 of the fuselage 2, to leave an unobstructed air space 23 throughout the length of the fuselage, is a wing 24, the forward end 26 of which is tapered to a sharp edge as shown by Fig. 3, in order to reduce the air resistance to a minimum when the airplane is in flight. The wing 24 is not much wider than the top 8 of the fuselage to further reduce the air resistance, but extends approximately the full length of the fuselage to provide sufficient area to lift the airplane when taking off and while in flight. The wing 24 is arched transversely so that its longitudinal axis will be higher than its longitudinal margins 26 and thus concentrate to a large degree the air current passing through the space 23 centrally beneath said wing so that there will be little danger of side slippage when the airplane is subjected to adverse winds while in flight. The fuselage 2 and the wing 24 are connected by suitable means such as stays 28 which are reinforced by wire braces 30 and 31.

32 designates the main fuel tank which is arranged in the lower portion of the fuselage 2 and extends approximately the full length thereof to reinforce the latter and provide maximum fuel capacity. Filler and drain openings are provided for filling and draining the tank 32, said openings being normally closed with plugs 34 and 36 to which access may be had through openings 38 and 40 in one side and the bottom, respectively, of the fuselage.

In order to prevent the fuel from rushing from one end to the other of the tank 32 while the airplane is ascending or descending a series of baffles 42 are provided which are spaced apart upon a rod 44 arranged axially of the tank 32. The tank 32 is firmly secured in place by a series of yokes 46 and 48 secured within the lower portion of the fuselage 2. As best shown by Fig. 10, said yokes are arranged in two sections which are secured together by suitable means such as bolts 50 so that they may be readily applied to the tank 32. The yokes are of approximately triangular configuration to fit within the lower portion of the fuselage 2 and their upper ends are formed to receive the lower ends of the stays 28 which are firmly held in place by suitable means such as transverse pins 52.

The yokes are also provided with eyes 54 and 55 to which the lower ends of the wire braces 30 and 31 are secured. Fuel from the main tank 32 may be supplied in any suitable manner to the motor 56 which drives the propeller 58. In the present instance I have provided the upper portion of the cabin 4 with an auxiliary tank 60 from which the fuel may flow to the motor by gravity through a pipe 62. A pump 64, having a suction pipe 66 leading from the main tank 32 and a discharge pipe 68 leading to the auxiliary tank 60, is provided for pumping the fuel from the main tank to the auxiliary tank. An overflow pipe 70 is provided for conducting any surplus fuel from the tank 60 back to the tank 32. The motor 56 may be of any approved type and mounted in any suitable manner. In the present instance I have shown it supported by a plate 72 firmly secured to the front end of the fuselage 2 and further secured by braces 74.

Referring now more particularly to the controls, 76 designates the rudder which is mounted upon a vertically disposed shaft 78 provided at its lower end with the rear skid 80. The rudder 76 is rendered very effective by locating it between the fuselage 2 and the wing 24 where it will be acted upon by the current of air flowing through the space 23. The shaft 78 is operably mounted in bearings 82 and 84 secured to the rear end of the wing 24 and the rear end of the main fuel tank 32, respectively. The rudder 76 is swung laterally to guide the airplane to the right or left by a tiller 86, from which rods or cables 88 extend forwardly into the cabin 4 where they are connected to levers 90 provided with fixedly mounted pedals 92, arranged within convenient reach of the occupants of the seats 20. The levers 90 are arranged to swing in a horizontal plane and are provided with bosses 92 mounted upon pivots 94 projecting upwardly from plates 96 secured to the floor 22 of the cabin.

The vertical movement of the airplane is controlled by a pair of elevators 98, one of which is arranged at each side of the rear portion of the wing 24. The elevators 98 are fixedly mounted upon a horizontally disposed shaft 100 journaled in bearings 102 secured to the longitudinal margins of the wing 24. Cranks 104 having pin and slot connections 106 with the forward portions of the elevators 98 are provided for raising and lowering the forward ends of the latter. Said cranks 104 are fixedly mounted upon a transverse shaft 110 journaled in bearings 112 and 116. The bearings 112 are fixed to the longitudinal margins of the wing 24 while the bearing 116 is secured to the central portion of said wing. The shaft 110 may be rocked in either direction by a pair of oppositely extending cranks 114 from which cables 117 extend forwardly over guide sheaves 118 and 120 to levers 122. Each lever 122 has a centrally disposed boss 124 fixedly mounted upon a vertical shaft 126 provided at its upper end with a fixedly mounted stick or handle bar 128. Each shaft 126 is mounted in an elongated bearing 130 having oppositely disposed slots 132 through which the levers 122 project and in which they are free to swing forwardly or backwardly to operate the cables 117. The bearing 130 is provided at its lower end with a semicircular flange 133 which is firmly clamped to the main fuel tank 32 by means of a cap 134 and bolts 136.

Referring now to the landing gear and the shock absorbing means at the under forward portion of the fuselage 2, 138 designates a pair of ground wheels which are mounted upon spindles 140 fixed to a pair of axle members 142 operably connected by pivots 144 to the lower portion of the foremost yoke 46, so that the lower ends of said axle members may move towards or away from each other under the impact caused by landing. The axle members 142 are reinforced with braces 146 extending rearwardly and upwardly to the rearmost yoke 46 so that they will not restrict the movement of said axle members 142.

The foregoing movements of the axle members 142 are retarded by shock absorbing means including a cylinder 150 closed at its upper end by a cap 152 which is operably connected by a pivot 154 to the lower portion of the foremost yoke 46. The cylinder 150 is provided at its upper portion with a partition 154 having a central aperture through which a vertically disposed rod 156 freely operates. The rod 156 is provided at its lower portion with a piston head 158 which operates freely in the cylinder 150. An expansion spring 160 is placed under compression between the partition 154 and the piston head 158 to normally hold the latter in lowered position. The lower end of the rod 156 is provided with a clevis 162 in which the adjacent ends of a pair of rods 164 are operably connected as with a pivot 166. The remote ends of the rods 164 are operably connected with pivots 168 to the lower portions of the axle members 142. With the foregoing shock absorbing means it is evident that after the wheels 138 contact with the ground on landing of the airplane the fuselage 2 and parts carried thereby can continue to move downwardly until checked through the increasing resistance of the spring 160 which is compressed between the partition 154 and the piston head 158. The resistance of the spring 158 is aided by an air cushion created in the upper portion 170 of the cylinder 150 by the piston head 158 which forces air upwardly through the aperture in the partition 154.

From the foregoing description it is apparent that I have provided an airplane embodying the advantages above pointed out, and although I have shown a monoplane type of airplane it is apparent that the latter can be readily converted into a biplane by extending the stays 28 to support another wing a suitable distance above the wing 24. I also reserve all rights to such other changes and modifications as may properly fall within the spirit and scope of the invention as claimed.

Having thus described my invention, what I claim and desire to secure by Letters Patent, is:

1. In an airplane, a fuselage, a fuel tank arranged in the lower portion of said fuselage and extending approximately the entire length of the latter, yokes for securing said tank in place, stays secured at their lower ends to said yokes, and a wing supported by said stays.

2. In an airplane, a fuselage of approximately triangular cross sectional configuration, a fuel tank arranged in the lower portion of said fuselage and extending approximately the entire length of the latter, a wing supported above said fuselage, a rudder mounted in bearings secured to the rear ends of the tank and said wing, and means for controlling said rudder.

3. In an airplane, a fuselage of approximately triangular cross sectional configuration, a fuel tank arranged in the lower portion of said fuselage, a wing supported above said fuselage, elevators mounted at opposite sides of said wing, a handle bar, means controlled by said handle bar for operating said elevator, and supporting means for said handle bar clamped upon the tank.

4. In an airplane, a fuselage, a fuel tank arranged in the lower portion of said fuselage and extending approximately the entire length of the latter, yokes for securing said tank in place, a pair of axle members operably connected to one of said yokes and provided with spindles, ground wheels mounted upon said spindles, a cylinder operably connected to the same yoke as the axle members, a partition in said cylinder, a piston operably mounted in said cylinder, a spring interposed between the partition and said piston, a rod connected to said piston and extending freely through the partition, a clevis secured to the lower end of said rod, and a pair of rods operably connected to said clevis and the axle member.

In testimony whereof I affix my signature.

OTTO J. BARTH.